United States Patent [19]

Metcalfe, III et al.

[11] 3,762,954

[45] Oct. 2, 1973

[54] PROCESS FOR ENHANCING THE CAPACITY OF A CARBON ELECTRODE

[75] Inventors: Joseph E. Metcalfe, III, Bedford Heights; Robert A. Rightmire, Northfield; Allan V. Marse, Independence, all of Ohio

[73] Assignee: The Standard Oil Company, Cleveland, Ohio

[22] Filed: Mar. 22, 1971

[21] Appl. No.: 126,807

[52] U.S. Cl. .................................. 136/22, 136/122
[51] Int. Cl. ........................................... H01m 35/02
[58] Field of Search ......................................
    136/121–122, 22.6, 83, 120, 100, 153, 155;
    252/62.3, 506, 515; 23/209.1–209.2, 209.5,
    209.3; 264/29, 61, 101, 105

[56] References Cited
UNITED STATES PATENTS

| | | | |
|---|---|---|---|
| 2,615,932 | 10/1952 | Marko et al. | 136/122 |
| 2,669,598 | 2/1954 | Marko et al. | 136/122 |
| 3,447,968 | 6/1969 | Rightmire | 136/6 |
| 3,476,603 | 11/1969 | Rafos | 136/22 |

*Primary Examiner*—Anthony Skapars
*Attorney*—John F. Jones and Sherman J. Kemmer

[57] ABSTRACT

The energy storage capacity of a carbon electrode can be increased by advantageously incorporating additive elements into the electrode by the process of initially heat-treating the carbon electrode at a temperature between 700° and 1,000° C under a partial vacuum; subsequently exposing the electode to the vapors of the desired compound under a slightly positive pressure and at a temperature below about 1,000° C; followed by cycling the electrode alternately in a charge and discharge direction in a cell containing a fused salt electrolyte composed of the halides of alkali metals or alkaline earth metals or their mixtures.

9 Claims, 1 Drawing Figure

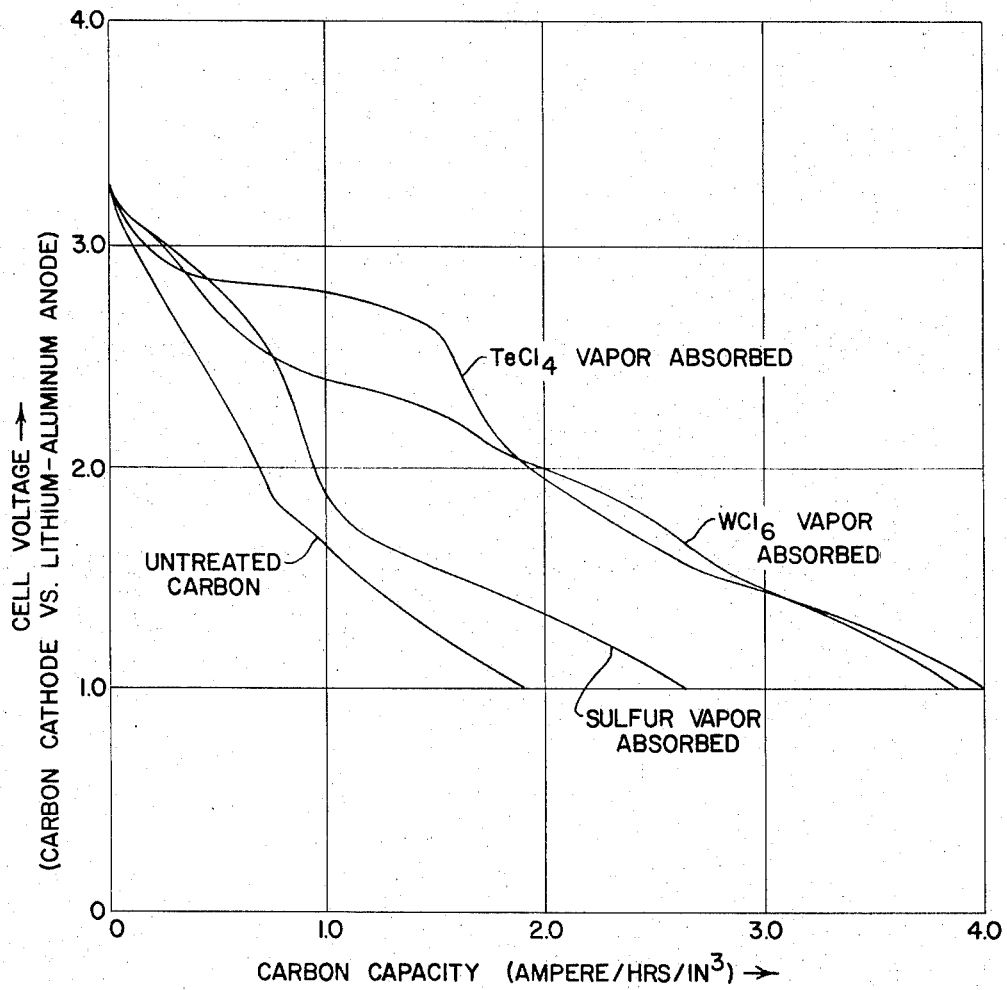

PROCESS FOR ENHANCING THE CAPACITY OF A CARBON ELECTRODE

This invention relates to a process for increasing the energy storage capacity of an electrical energy storage device. More particularly this invention relates to a process for increasing the electrical energy storage capacity of a carbon electrode employed in said electrical energy storage device by advantageously incorporating additive elements into the electrode by means of vapor absorption.

Although this process may be employed as a means for the addition of any additive element or compound that will increase the capacity of a carbon electrode, that can be volatilized under the conditions of the process, and that can be readily absorbed by the carbon, this process particularly pertains to additives containing the elements of tellurium, tungsten or sulfur. The electrical energy storage capacity of a carbon electrode may be appreciably enhanced and in some instances virtually doubled by vapor absorption of certain compounds of the elements of tellurium, tungsten or sulfur and their mixtures, in the manner herein described.

The additive-containing carbon electrode produced by the process of this invention functions as a reversible positive electrode in an electrical energy storage system wherein the negative electrode comprises aluminum or an alloy of aluminum, and the electrolyte is a fused salt composed of the halides of alkali metals or alkaline earth metals, or mixtures thereof.

In accordance with this invention, improved electrode performance is readily obtained by incorporating a suitable compound of the desired element into the carbon electrode by the process of initially heat-treating the carbon electrode at a temperature of up to 1,000° C under a partial vacuum to remove oxygen, hydrogen and water therefrom; subsequently exposing the electrode to the vapors of the desired compound under a slightly positive pressure and at a temperature above the boiling point of the compound and below about 1,000° C; followed by cycling the electrode alternately in a charge and discharge direction in a cell containing a fused salt electrolyte composed of the halides of alkali metals or alkaline earth metals and their mixtures.

Although it is possible to incorporate additives into the carbon electrode by other methods such as physically mixing the additive element or compound with the carbon, the vapor absorption technique described in this invention is the preferred method.

The vapor absorption technique has a number of outstanding advantages over other methods most often used for similar purposes. The composition and the performance of the electrodes treated in accordance with the present invention are readily reproduced. A cell containing an electrode produced by this process has a characteristically low leakage current and high utilization efficiency of the additive element. The composition of the electrode is very stable, and continuous over-charge can be sustained over a long period of time without observing any loss of the additive element or decline in capacity.

In a preferred mode of preparing the electrode of this invention the carbon electrode is heated to a temperature of from about 700° to 1,000° C under a pressure of less than one atmosphere for a period of about 2 to 10 hours; followed by exposing the electrode to a flow of vapors of the element or a desired compound of the elements of tellurium, tungsten or sulfur at a slightly positive pressure and at a temperature at which sufficient vapor pressure of the element or compound is generated up to about 1,000° C, for a period of from 2 to 10 hours; and subsequently immersing the additive-containing electrode in a cell containing a negative electrode consisting essentially of a lithium-aluminum alloy and a molten salt electrolyte composed of a mixture of potassium chloride and lithium chloride or potassium bromide and lithium bromide, and cycling the cell between the limits of about 1.0 to 3.3 volts. Cycling causes the formation of an electrochemically "active" species of the carbon with the additive element.

The nature of the "active" species or complex thus formed is not definitely known. It is postulated that on absorption, the additive element forms a surface complex with the carbon, then on alternate charge and discharge of the cell, the bond is strengthened and the additive element becomes permanently bonded to the carbon. In instances where the electrode is composed of graphite, it is possible for some elements to form intercalation compounds with the graphite. Although some additional capacity can be derived from such compounds, a much greater increase in capacity is derived from the complex formed with the additive element and the amorphous, porous carbon employed in this invention. The bond between the amorphous carbon and the additive element tellurium, tungsten or sulfur is manifested by a characteristic higher average discharge voltage occurring in the discharge profile of the cell.

The additives may be added to the system in the form of any compound that is readily vaporized under 1,000° C, and is compatible with the ions of the system so that elements foreign to the system will neither contaminate nor plate out on the surfaces of the electrodes. Examples of compounds that are suitable for this purpose include the halides of tellurium, tungsten and sulfur, tungsten oxychlorides, sulfur oxychlorides, elemental sulfur, and the like. The preferred compounds are those containing anions that are already present in the cell system. Those particularly suitable are the halides of tellurium, tungsten and sulfur, and elemental sulfur.

The concentration of the tellurium, tungsten or sulfur required in the carbon electrode to bring about a discernible enhancement in energy storage capacity is in the range of about 5 to 40 percent by weight of the additive element based on the weight of the carbon and preferably should consist of amounts of from about 5 to 35 percent by weight, based on the weight of carbon.

Since absorptivity is related to carbon source, the carbon comprising the cathode in this invention is one that will readily absorb the additive compounds. Preferably the carbon is an amorphous, highly porous, high surface area carbon in the form of finely divided particulate material. A broad range of carbons is suitable for this purpose. Carbons in accordance with the present invention can be derived from activated petroleum coke, wood char, activated sodium lignosulfonate char, activated bituminous coal, polyvinylidene chloride chars, polyacrylonitrile chars and the like. The active carbon has a surface area in the range of 100–2,000 $m^2/g$, and most preferredly in the range of 300–1,500 $m^2/g$, as measured by the Brunauer-Emmett-Teller method. The surface area of the carbon is mainly internal and may be generated by activation. The pores in the activated carbon must be of sufficient size to permit additive and electrolyte penetration. The carbon composition need not be limited to these types of carbon, however. A very useful polymeric electrode material can be obtained by polymerizing a mixture of a vinyl nitrile monomer and a polyalkenyl monomer containing at least two polymerizable alkenyl groups, as more fully described in U. S. Pat. No. 3,476,603, and carbonizing same.

The additive-containing carbon electrode of this invention is particularly adapted to be used in an electrical energy storage cell where the negative electrode may comprise any one of several different metals or metal alloys that are stable in the electrolyte melt of alkali metal or alkaline earth metal halides. For example, the negative electrode may be composed of a metal such as lithium, sodium, potassium, magnesium, bismuth, or antimony, or alloys of these metals. Lithium is particularly suitable and alloys of lithium with such metals as aluminum, indium, tin, lead, silver and copper may also be employed. Ternary lithium alloys can likewise be used. Especially preferred is an aluminum-lithium electrode which can be produced by preparing an alloy of aluminum and lithium, or, alternatively, by preconditioning or cycling a substantially pure aluminum electrode in an electrolyte containing lithium ions, during which preconditioning process lithium is diffused into the aluminum electrode structure. The former is the preferred embodiment.

The preferred aluminum-lithium alloy of the electrode comprises aluminum in amounts of from about 70 to 95 weight percent and from about 5 to 30 weight percent of lithium, based on total composition. Incidental impurities such as, for example, copper, magnesium, manganese, indium and iron may be present in quantities less than 10 weight percent, based on total composition. An aluminum-lithium electrode of this range of composition operates at substantially constant voltage and exhibits high electrical energy storage capabilities.

The electrolyte used in the device of this invention is a fused salt mixture containing alkali metal and alkaline earth metal halides, as for example lithium chloride, potassium chloride, sodium chloride, calcium chloride, calcium fluoride, magnesium chloride, lithium bromide and potassium bromide. The lowest melting point media are most desirable. However, it is contemplated by the present invention that the medium be operable in the liquid state at temperatures in the range of 350° to 600° C.

Typical examples of materials which can be used as binary salt electrolytes include lithium chloride-potassium chloride, potassium chloride-magnesium chloride, magnesium chloride-sodium chloride, lithium bromide-potassium bromide, lithium fluoride-rubidium fluoride, magnesium chloride-rubidium chloride, lithium chloride-lithium fluoride, lithium chloride-strontium chloride, cesium chloride-sodium chloride, calcium chloride-lithium chloride, and mixtures thereof.

Examples of ternary electrolytes are calcium chloride-lithium chloride-potassium chloride, lithium chloride-potassium chloride-sodium chloride, lithium chloride-potassium chloride-magnesium chloride, calcium chloride-lithium chloride-sodium chloride, and lithium bromide-sodium bromide-lithium chloride.

The preferred electrolyte systems are those of potassium chloride-lithium chloride and lithium bromide and potassium bromide, and mixtures thereof. A lithium chloride-potassium chloride system of 41 mole percent potassium chloride and 59 mole percent lithium chloride forms a eutectic which melts at 352° C and has a decomposition voltage of about 3.3 volts.

To insure good electrical structure and full capacity of the electrical energy storage cell, easily degradable components in the structure are removed and the electrodes are permeated with electrolyte for maximum operational efficiency. This is accomplished by preconditioning the electrical energy storage cell by immersing the positive carbon-containing electrode and the negative electrode in the electrolyte and alternately charging and discharging the cell at a constant predetermined voltage. This cycling converts the carbon into a good electron conductor or negative charge holding medium, and causes the electrochemical association of the carbon with certain constituents from the eutectic melt of the electrolyte.

The formation of the electrochemically produced "active" tellurium, tungsten or sulfur species in the carbon electrode may take place concurrently with the preconditioning treatment of the electrode, by cycling the cell between the voltage limits of about 1.0 to 3.3 volts.

This invention will be further illustrated by reference to the following examples. The examples are illustrations of specific embodiments of the invention and are not to be construed in any way as limitations of the invention.

The experiments were carried out in a stainless steel test tube cell. The carbon electrode was fixed rigidly to a graphite current carrier and the negative metallic electrode was fixed rigidly to a steel current carrier. The container comprising the electrolyte and electrodes was purged of atmospheric air and an inert gas was introduced into the container and then sealed.

EXAMPLE 1

A carbon cathode having the dimensions of 1¼" × 1½" × 0.025" was prepared from a commercial grade carbon (No. 5052) produced by Pure Carbon Company, and having the following physical properties: Surface area - 450 m$^2$/g Density - 0.81 g/cc Porosity - 47–51% (vol.).

The electrode was vacuum heat-treated at about 1,000° C for a period of 8 hours at a pressure of less than 1 atmosphere. It was then exposed to vapors of tellurium tetrachloride (TeCl$_4$) at 454° C and 1 atmosphere of pressure for 4 hours. After exposure to the tellurium tetrachloride vapors in a sealed steel container, the electrode showed a weight gain of 8 g/in.$^3$, which included TeCl$_4$ absorbed on the graphite header. The electrode was then placed in a stainless steel cell assembly, as described above, containing an aluminum-lithium alloy anode having the dimensions 3" × 2" ×0.03" and initially containing 11 percent by weight of lithium, and a molten salt electrolyte composed of a eutectic mixture of 41 mole percent potassium chloride and 59 mole percent lithium chloride. An argon atmosphere was established in the cell and the cell was operated at a temperature of 450° C. The cell was cycled for approximately 50 cycles between the voltage limits of 3.28 and 1 volt across the cell, and discharged at a constant current of 500 milliamperes/in.$^2$ of cathode. Under these conditions, the tellurium-containing carbon electrode had a capacity of 4.03 ampere hours/in.³ of cathode.

EXAMPLE 2

An electrode having the same carbon composition and dimensions as that of Example I was vacuum heat-treated at 1,000° C at less than 1 atmosphere of pressure for 7 hours and was then exposed to vapors of tungsten hexachloride ($WCl_6$) at 460° C at 1 atmosphere of pressure for 2 hours. After exposure to the $WCl_6$ vapors, the electrode showed a weight gain of 2.5 g/in.³ of carbon (including $WCl_6$ absorbed on the graphite header). The electrode was then placed in a cell assembly as described in Example 1 and was cycled between 1.0 volt and 3.28 volts at a constant current discharge of 500 milliamperes/in.² of cathode. The capacity of the electrode was 3.86 ampere hours/in.³ of carbon.

EXAMPLE 3

The tungsten-containing carbon electrode of Example 2 was cycled for 41 cycles in the same cell assembly as in Example 2, between 1.0 volt and 3.28 volts open circuit. On the 41st cycle, the electrode was overcharged (chlorine evolved at the carbon electrode) at a constant current of approximately 500 milliamperes/in.² of the carbon electrode for 1 hour. The discharge of the electrode following this charge showed no loss in capacity.

EXAMPLE 4

A carbon electrode was prepared having the composition 60 weight percent of a porous activated carbon having a density of 0.76–0.79 g/cc, a surface area of 800 m²/g and a U.S. standard mesh size of 100–140 (from Pittsburgh Activated Carbon Co.), 20 weight percent graphite and 20 weight percent of a binder comprising a thermosetting phenolic-based resin (Borden S.D. 5143). The components were mixed in the desired proportions and compressed into a carbon plate having the dimensions 1¼'' × 1½'' × 0.025''. The electrode was heat-treated and subsequently exposed to vapors of tungsten hexachloride $WCl_6$) under the same conditions as described in Example 2, and a weight gain of 13.1 g/in.³ of cathode was obtained (including $WCl_6$ deposited on graphite header). On cycling the electrode in a cell as in Example 1, a total electrode capacity of approximately 3.4 ampere hours/in³ of cathode was obtained at a constant discharge current of 500 milliamperes/in² cathode.

EXAMPLE 5

A carbon electrode of the carbon composition and dimensions of Example I was vacuum heat-treated at 998° C under a pressure of less than 1 atmosphere for 2 hours. The electrode was then exposed to sulfur vapors at 475° C at a pressure of slightly above 1 atmosphere for 3 hours. After exposure to sulfur vapors the electrode showed a weight gain of 10.30 g/in.³ of cathode. On cycling the electrode in a cell as in the above examples at a constant current discharge of 500 milliamperes/in.² of cathode, the sulfur-containing carbon electrode had a capacity of 2.76 ampere hours/in.³ of cathode.

EXAMPLE 6

An untreated carbon electrode having the same carbon composition and dimensions as indicated in Example 1 was placed in a cell and was cycled in the same manner as described in this example. The untreated carbon electrode had a measured capacity of 1.96 ampere hours/in.³ of carbon electrode.

The discharge cell voltage curves for the additive-containing carbon electrodes of Examples 1, 2 and 5 compared with the untreated electrode of the same carbon composition of Example 6 are shown in the accompanying FIGURE The data illustrate the improvement obtained in the capacities as well as the plateaus apppearing in the discharge curves for the carbon electrodes containing the tellurium, tungsten and sulfur additives, and the gradual downward slope of the discharge curve for the untreated carbon electrode. The effect on capacity of vapor absorption of tungsten halide on an electrode composed of a mixture of graphite and amorphous, activated carbon is illustrated by Example 4. The data show that the tungsten additive is considerably less effective in increasing the capacity of an electrode containing graphite.

EXAMPLE 7

An electrode of the carbon composition and dimensions of that in Example 1 was heat-treated at 250° C for 3 hours under a pressure of less than 1 atmosphere. The electrode was then exposed to sulfur vapors at 470° C and 1 atmosphere of pressure for 3 hours. On opening the reaction vessel, significant amounts of by-products were found on the surface of the carbon and on the container walls. When placed in a cell as in Example 5, and cycled in the same manner, the electrode did not have a well-defined plateau and showed a lower average voltage on discharge as compared with that of the sulfur-containing electrode that had been heat-treated at approximately 1,000° C. The capacity of the electrode in this experiment was 2.18 ampere hours/in.³ of carbon.

We claim:

1. A process for increasing the energy storage capacity of an amorphous carbon electrode comprising the steps of:
    a. heat-treating the carbon electrode to a temperature of from about 700° to 1,000° C under a partial vacuum;
    b. subjecting the heat-treated carbon electrode under a slightly positive pressure to the vapors of an additive which consists of at least one member selected from the group consisting of tellurium halides, tungsten halides, sulfur halides, tungsten oxychlorides, sulfur oxychlorides and elemental sulfur, at a temperature above the boiling point of the additive and below about 1,000° C;
    c. immersing the electrode resulting from step (b) in a cell containing a second electrode comprising aluminum and a fused salt electrolyte composed of at least one member selected from the group consisting of the halides of the alkali metals, the alkaline earth metals, and their mixtures, and cycling said electrode alternately in a charge and discharge direction while in contact with said electrolyte.

2. The process of claim 1 wherein the electrolyte in step (c) comprises a lithium halide-containing salt.

3. The process in claim 2 wherein the second electrode consists essentially of an alloy of aluminum and lithium.

4. The process in claim 3 wherein the electrolyte is a mixture of lithium chloride and potassium chloride.

5. The process in claim 4 wherein the second electrode is composed of an alloy having the composition 70 to 95 weight percent aluminum and 5 to 30 weight percent lithium and the electrolyte consists of a eutectic mixture of lithium chloride and potassium chloride.

6. The process in claim 1 wherein the additive in step (b) is a tellurium halide.

7. The process in claim 1 wherein the additive in step (b) is a tungsten halide.

8. The process in claim 1 wherein the additive in step (b) is elemental sulfur.

9. The process in claim 3 wherein the electrolyte is a mixture of lithium bromide and potassium bromide.

* * * * *